United States Patent [19]

Tomida et al.

[11] Patent Number: 4,957,851
[45] Date of Patent: Sep. 18, 1990

[54] IMAGE RECORDING MEDIUM COMPRISING A DIACETYLENE DERIVATIVE COMPOUND FILM AND A RADIATION ABSORBING LAYER

[75] Inventors: Yoshinori Tomida; Hiroshi Matsuda, both of Yokohama; Kunihiro Sakai, Tokyo; Yukuo Nishimura, Sagamihara; Takashi Nakagiri; Toshihiko Miyazaki, both of Tokyo, all of Japan

[73] Assignee: Canon Kabushiki Kaisha, Tokyo, Japan

[21] Appl. No.: 240,490

[22] Filed: Sep. 6, 1988

Related U.S. Application Data

[63] Continuation of Ser. No. 851,090, Apr. 14, 1986, abandoned.

[30] Foreign Application Priority Data

Apr. 16, 1985 [JP] Japan .................. 60-80852
Apr. 16, 1985 [JP] Japan .................. 60-80855

[51] Int. Cl.$^5$ .................. G03C 1/78; G03C 1/94; G03C 1/68

[52] U.S. Cl. .................. 430/272; 430/944; 430/945; 430/495; 430/494; 430/273; 430/278; 430/286; 430/327; 430/926; 369/284; 369/285; 346/135.1; 346/76 L; 346/76 R; 346/76 PH

[58] Field of Search .................. 430/944, 21, 945, 495, 430/494, 21, 273, 286, 327, 926, 272, 278; 346/135.1, 76 L, 76 R, 76 PH; 369/284, 285

[56] References Cited

U.S. PATENT DOCUMENTS

| | | | |
|---|---|---|---|
| 3,723,121 | 3/1973 | Hauser | 430/945 X |
| 4,439,514 | 3/1984 | Garito | 430/270 X |
| 4,539,061 | 9/1985 | Sagiv | 427/35 X |
| 4,562,141 | 12/1985 | Tieke | 430/270 X |
| 4,592,980 | 6/1986 | Tomida et al. | 430/59 X |

Primary Examiner—Marion C. McCamish
Assistant Examiner—Cynthia Hamilton
Attorney, Agent, or Firm—Fitzpatrick, Cella, Harper & Scinto

[57] ABSTRACT

An image forming medium is provided which has an image forming layer comprising a monomolecular film of a diacetylene derivative compound or its built-up film and a radiation absorbing layer. The diacetylene derivative compound may be polymeric. An image forming device employing the image forming medium is also provided.

11 Claims, 2 Drawing Sheets

IMAGE RECORDING MEDIUM COMPRISING A DIACETYLENE DERIVATIVE COMPOUND FILM AND A RADIATION ABSORBING LAYER

This application is a continuation of application Ser. No. 851,090, filed Apr. 14, 1986, now abandoned.

BACKGROUND OF THE INVENTION

1. Field of the Invention

This invention relates to an image forming medium which functions by utilizing the chemical or physical change of a monomolecular film of a diacetylene (or polydiacetylene) derivative compound or its built-up film, and to an image forming device by utilizing the same.

2. Related Background Art

In the prior art, various recording media have been known as the recording medium by use of an organic compound as the recording layer.

For example, Japanese Laid-open Pat. Publication No. 125246/1983 discloses an optical recording medium comprising a recording layer composed of a thin film of an organic compound.

This recording medium uses an organic dye for the recording layer, and record reproducing is effected with a laser beam.

The medium disclosed in Japanese Laid-open Pat. Publication No. 125246/1983 uses a thin film of a cyanine dye represented by the formula shown below as the recording layer:

Formula:

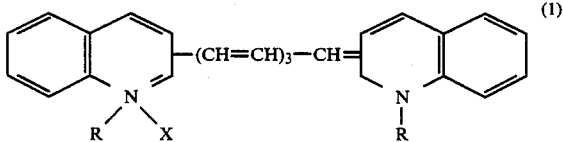

(1)

A solution of the cyanine dye represented by the formula (1) is applied by use of a rotary coater on a plastic substrate having a thickness of 1000 Å or less, for example, about 300 Å, to form a thin film on the plastic substrate. If the molecules are distributed and oriented randomly within the film, light will be scattered in the film on light irradiation, and the degree of reaction occurring per every light irradiation will differ microscopically. Accordingly, as the recording medium, it is desirable that the molecular distribution and orientation within the film be uniform, and also the film is desirably to be as thin as possible for obtaining a higher density of recording. However, according to the coating method, the lower limit of the film thickness is about 300 Å, and it is hardly possible to solve the problem of random molecular distribution and orientation within the film.

In the prior art, LED.CRT liquid crystal device (hereinafter called LCD), electrochromic device (hereinafter called ECD), and electroluminescence device (hereinafter called ELD), etc. have been known as the displaying device.

Among them, LCD, ECD and ELD may be mentioned as the miniature and high-density devices. However, these devices involve a number of disadvantages as shown below.

(1) Film is thick and layer constitution is complicated.
(2) Electrode wiring is complicated.
(3) Not suited for ultra-high density and large area.

Further, LCD involves the problems:

(4) Direction of observation is limited.
(5) Response speed is slow.

ECD involves the problems:

(6) Use of an electrolyte necessitates assembly of a cell.
(7) Redox reaction in an electrolyte is susceptible to reactions with impurities.
(8) Safety is insufficient.

ELD has the problem:

(9) Luminance is low.

SUMMARY OF THE INVENTION

The present invention has been accomplished as the result of various investigations, in order to overcome such disadvantages of the prior art and to achieve a method to (1) prepare various functional films with relative ease, (2) to form films so that the various functions possessed by the functional molecule may be exhibited without damaging or lowering even when formed into thin films, and further (3) to orient the film constituting molecules with a high degree of ordered structure in the film-spreading direction without performing special operations. By employing such a preparation method, it has been made possible to provide an image forming medium of high sensitivity and high resolution with ease and good quality.

An object of the present invention is to provide a high-density and high-resolution image forming medium employing a chemical or physical change in molecular size or molecular group size by an external cause.

Another object of the present invention is to provide an image forming medium which is more excellent prior art with respect to the molecular orientation within the medium, which is an important factor during performing high density recording by such change in molecular size or molecular group size.

Further, another object of the present invention is to provide an image forming medium with good output energy conversion efficiency relative to input energy.

Still another object of the present invention is to provide an image forming device excellent in drivability, productivity and reliability.

According to an aspect of the present invention, there is provided an image forming medium, having an image forming layer comprising a monomolecular film of a diacetylene derivative compound or its built-up film and a radiation absorbing layer.

According to another aspect of the present invention, there is provided an image forming medium, having an image forming layer comprising a monomolecular film of a polydiacetylene derivative compound or its built-up film and a radiation absorbing layer.

According to still another aspect of the present invention, there is provided an image forming device, provided with an image forming medium having an image forming layer comprising a monomolecular film of a polydiacetylene derivative compound or its built-up film and a radiation absorbing layer, and an optical signal inputting means and an optical signal scanning means for inputting and scanning optical signals according to information signals at a predetermined site of said medium.

DETAILED DESCRIPTION OF THE PREFERRED EMBODIMENTS

The image forming medium as herein mentioned is inclusive of recording medium, displaying medium and optical modulating medium.

The substance constituting the image forming layer of the present invention comprises a molecule having each at least one hydrophilic site, hydrophobic site and diacetylenic site (hereinafter called diacetylene derivative compound) represented by the following formula:.

Formula:

X : hydrophilic site;
R, R' : hydrophobic site;
C≡C—C≡C : diacetylenic site;
n : 0 or 1.

In the above formula, the hydrophilic site may be, for example, a polar group such as hydroxyl, carboxyl, amino, nitrile, thioalcohol, imino, sulfonyl, or sulfinyl group, or a salt thereof. As the hydrophobic group, R may represent a saturated aliphatic hydrocarbon group such as alkyl or cycloalkyl group; an olefinic hydrocarbon group such as vinyl, or propenyl group or the like; an aromatic hydrocarbon group such as phenyl, naphthyl, alkylphenyl the like. R' may include a divalent organic radical such as alkylene, alkenylene, phenylene, etc. The total number of carbon atoms of R and R' may preferably be from 10 to 30.

Figure 3A:
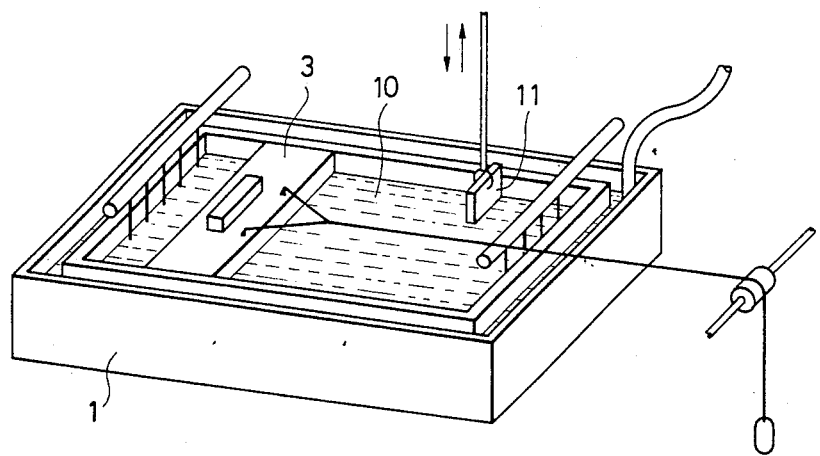
FIGS. 3A and 3B are schematic illustrations showing an example of the device for preparation of a monomolecular film by the LB method.
Figure 3B:
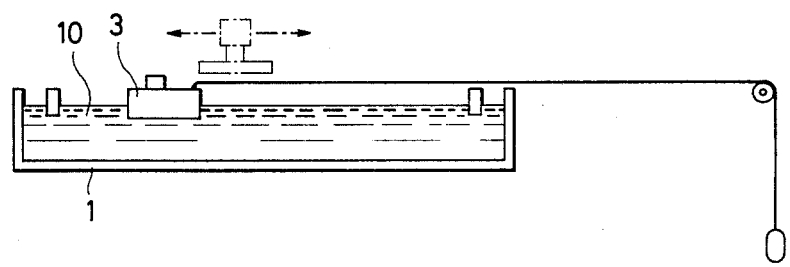

As the method for preparing a monomolecular film or monomolecular built-up film, there may be employed, for example, the Langmuir-Blodgette method (hereinafter referred to as LB method) developed by I. Langmuir et al. The LB method is a method for forming a monomolecular film or a built-up film of monomolecular layers by utilizing the phenomenon that, for example, in a molecule with a structure having a hydrophilic site and a hydrophobic site in the molecule, when the balance between the two (amphiphilic balance) is adequately maintained, the molecule forms a monomolecular layer on the water surface with its hydrophilic group directing downwardly. The monomolecular layer on the water surface has the characteristic of a two-dimensional system. When the molecules exist sparsely, the formula of the two-dimensional ideal gas is valid between the area per molecule and the surface pressure $\pi$:

$$\pi A = kT,$$

whereby "a gas film" is formed. In the formula, k is the Boltzman's constant and T is the absolute temperature. By making A sufficiently small, the interaction between the molecules is intensified to give a two-dimensional solid "condensed film (or solid film)". The condensed film can be transferred one layer by one layer onto the surface of a carrier of various materials with various shapes such as glass substrates. By use of this method, the monomolecular film or built-up film of monomolecular layers of the diacetylene derivative of the present invention can be prepared according to, for example, the specific procedure as described below. An example of the device is shown in FIGS. 3A and 3B.

A desired diacetylene derivative compound is dissolved in a solvent such as chloroform. The resulting solution is spread over the aqueous phase 10 in the water tank 1 to form a film of the diacetylene derivative compound.

Then, the spreading area is restricted to control the gathering state of the film substance by providing a partitioning plate (or float) 3 so that the spreaded layer may not be excessively expanded by diffusing freely over the surface of the aqueous phase, thereby obtaining a surface pressure $\pi$ which is proportional to the gathering state. The surface pressure can be gradually increased by reducing the spreading area by moving the partitioning plate 3, thereby controlling the gathering state of the film-forming substance to be set at a surface pressure $\pi$ which is suitable for preparation of the built-up film. While maintaining the surface pressure, a clean carrier 11 is moved vertically up and down, whereby the monomolecular film of the diacetylene derivative compound (hereinafter called diacetylene monomolecular film) can be transferred onto the carrier 11. The diacetylene monomolecular film can be prepared as described above, and by repeating the above operation, a built-up diacetylene monomolecular film with a desired number of built-up layers can be formed. For transfer of the diacetylene monomolecular film onto a carrier, other than the vertical dipping method as described above, the horizontal lifting method or the rotary cylinder method may be available. The horizontal lifting method is a method in which transfer is effected by permitting the carrier to contact the water surface horizontally, while the rotary cylinder method is a method in which a cylindrical carrier is permitted to rotate on the water surface to transfer the film onto the carrier surface. In the vertical dipping method as described above, when a carrier having a hydrophilic surface is withdrawn from water in the direction across the water surface, a diacetylene monomolecular film with the hydrophilic group of the diacetylene derivative compound faced toward the carrier side is formed on the carrier. By moving vertically the carrier as described above, diacetylene monomolecular films are laminated one by one per every stroke. Since the orientation of the film forming molecule in the withdrawing stroke is opposite to that in the dipping stroke, according to this method, Y type film is formed in which hydrophilic groups and hydrophobic groups of the diacetylene derivative compound are opposed to each other between the respective layers.

In contrast, according to the horizontal lifting method, a diacetylene monomolecular film with the hydrophobic groups of the diacetylene derivative compound faced toward the carrier side is formed on the carrier. In this method, even when built up, there is no alternation in orientation of the film forming molecules, but X type film is formed in which hydrophilic groups are faced toward the carrier side in all the layers. On the contrary, the built-up film in which the hydrophilic groups are faced toward the carrier side in all the layers is called Z type film.

The method for transferring monomolecular layers is not limited to these methods, but it is also possible to employ a method in which a carrier is extruded into an aqueous phase from a carrier roll, when employing a large area carrier. Also, the orientations of the hydrophilic groups and hydrophobic groups relative to the carrier as described above are merely explanations of the principle, and they can be changed by surface treatment of the carrier, etc.

The diacetylene monomolecular film and the diacetylene monomolecular built-up film formed on the carrier according to the method as described above has a high density and also a highly ordered characteristic, and it is possible to obtain an image forming medium having a displaying, recording function of high density and high resolution capable of displaying, optical recording and thermal recording depending on the function of the diacetylene derivative compound by constituting an image forming layer with these films.

The image forming medium formed as described above changes in apparent color through the change in absorption wavelength by the action of light, heat or a solvent.

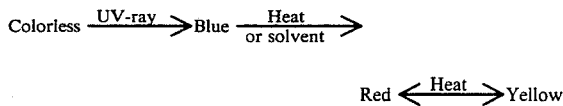

When UV-ray is irradiated on an initially colorless film, it changes to blue with the maximum absorption wavelength of 620 to 660 nm. This changes occurs by irradiation of UV-ray, but does not occur by heat or a solvent. Since it is an irreversible change, the film which has once turned blue will never return to the colorless transparent film.

Then, by heating the blue film to about 50° C. or treating it with a solvent such as acetone or ethanol, it turns red with the maximum absorption wavelength of 540 nm. This change is also irreversible.

The irreversible treatments means the above-mentioned treatment in the present invention:

Further, by heating the red film to about 300° C., a yellow film is obtained, with its maximum absorption wavelength being about 450 nm. The yellow film returns to the original red film at room temperature.

Therefore, this heating treatment is a reversible treatment.

The present invention utilizes such characteristics of a (poly)diacetylene for recording and displaying, and the recording and displaying medium, and the displaying principle of the present invention are described below by referring to the examples shown in the drawings.

Figure 1A:
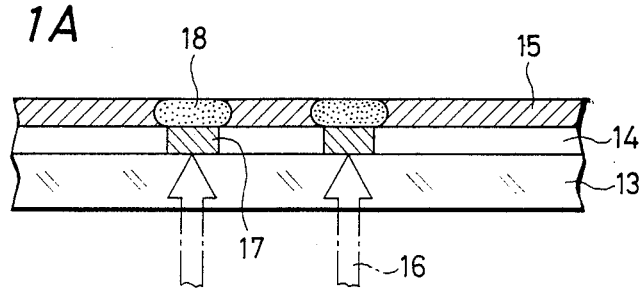
FIGS. 1A and 1B are schematic sectional views of the image forming medium of the present invention, showing an example of recording and displaying.
Figure 1B:
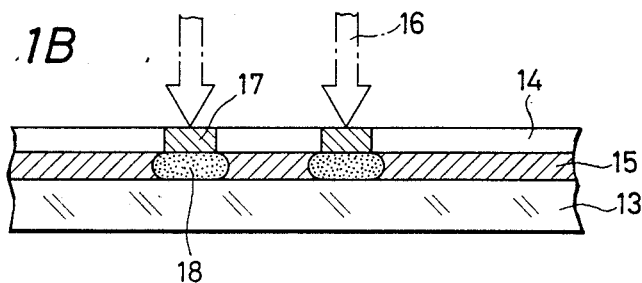

FIGS. 1A and 1B are exemplary schematic illustrations showing the constitution of the image forming medium of the present invention.

For the substrate 13, various solid materials such as glass, plastic, paper, metal, etc. may be used, but if necessary, the materials may be limited to those which can permit radiation of a specific wavelength to pass therethrough.

14 is a radiation absorbing layer, which absorbs radiation, particularly IR-ray with good efficiency to convert it to heat and transmit said heat to the image forming layer 15.

The radiation absorbing layer 14 can be obtained by film fabrication of various known inorganic or organic materials which are themselves hardly fusible by heat. As such materials, for example, those capable of absorbing IR-ray include Si, SiO, $SiO_2$, ZnS, $As_2S_3$, $Al_2O_3$, NaF, ZnSe, Gd.Tb.Fe, carbon black, metal phthalocyanine, etc.

However, the radiation absorbing layers according to the present invention are not limited to the ones absorbing only IR-ray, but the material may be any material capable of absorbing the radiation of a specific wavelength employed and converting it to heat.

The radiation absorbing layer may have a thickness of 100 Å to 1 $\mu$m, more preferably 200 Å to 5000 Å.

In the image forming medium of the present invention used as the recording medium, the image forming layer (recording layer) is constituted of a monomolecular film of the polydiacetylene derivative compound or its built-up film which has turned blue by the above irreversible treatment. In the image forming medium of the present invention used as the displaying medium, the image forming layer (displaying layer) is constituted of the monomolecular film of the polydiacetylene derivative compound or its built-up film which has turned red by the above irreversible treatment.

In any case, the image forming layer has a thickness of 10 Å to 1 $\mu$m, more preferably 10 Å to 5000 Å.

FIG. 1A shows the case in which the substrate, the radiation and the image forming layer are laminated in this order, while FIG. 1B shows the case in which the substrate, the image forming layer and the radiation absorbing layer are laminated in that order.

In the image forming medium shown in FIG. 1B, at least one of the substrate and the radiation absorbing layer is required to be transparent.

A protective film not shown may also be provided on the image forming layer in FIG. 1A or the radiation absorbing layer in FIG. 1B.

Recording by use of such an image forming medium is performed as described below:

(1) On the image forming medium (recording medium) shown in FIGS. 1A and 1B, a laser beam (particularly IR-ray beam) 16 which is turned on or off according to the information signals is irradiated by scanning on a predetermined site 17 on the irradiation absorbing layer 14.

(2) The site 17 to be irradiated on the irradiation absorbing layer 14 is heated, and the heat generated is transmitted to the corresponding site 18 on the recording layer 15 adjacent or near thereto.

(3) The corresponding site 18 is heated to cause color change.

Thus, a recorded image (e.g. recorded image of red color) corresponding to the information input can be obtained.

This color change is irreversible and the color will not return to the original color.

Displaying in the case of utilizing the image forming member of the present invention can be performed according to the same method as in recording. However, for the image forming layer, a red film prepared by the irreversible treatment is employed.

In this case, the image obtained is a yellow image

Also, since the color-changed portion will restore the original color by cooling, reproduction is possible, and even an animated image can be formed by controlling the cooling speed.

Figure 2:
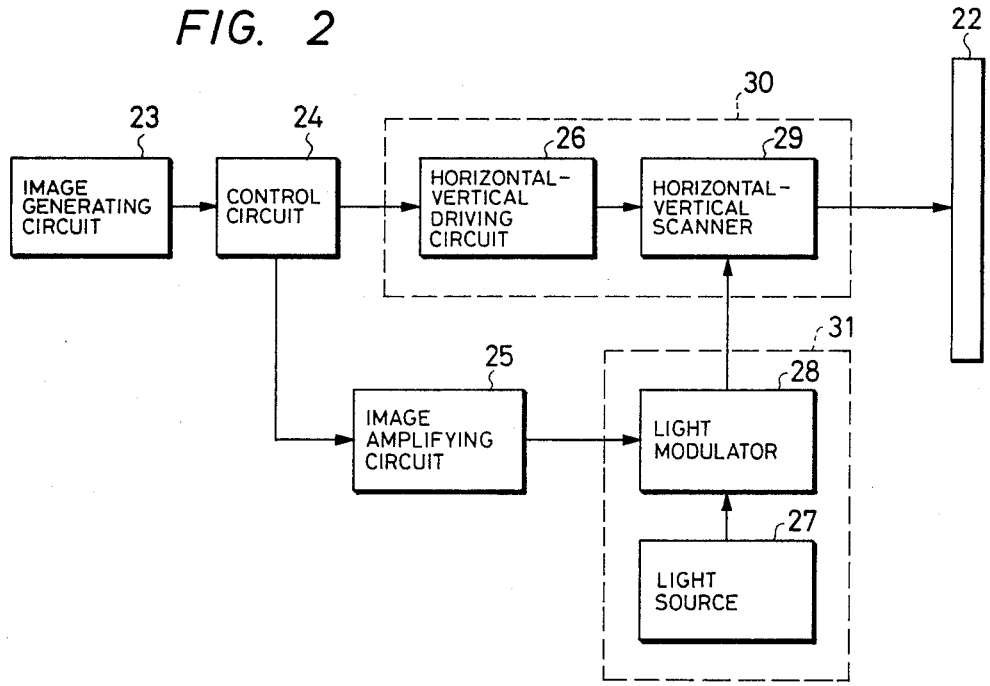
FIG. 2 is a block diagram showing the image forming device of the present invention.

Next, an example of the image forming device (displaying device) utilizing the image forming medium (displaying medium) is explained by referring to FIG. 2.

In the Figure, 30 is an optical scanning means and is constituted of horizontal-vertical driving circuit 26 and a horizontal-vertical scanner 29. 31 is an optical signal inputting means and is constituted of a light source 27 and an optical modulator 28.

The image signal output form the image generating circuit 23 is amplified through the controlling circuit in the image amplifying circuit 25. By input of the amplified image signal, the optical modulator 28 is driven to modulate the optical beam emitted from the light source 27.

Thus, a two-dimensional image corresponding to the image signal is formed on the image forming medium (displaying medium) 22.

The effects of the present invention are enumerated below.

(1) High density recording and displaying are possible since the image forming layer has high density and highly ordered characteristic.

(2) S/N ratio is improved due to great difference in transmittance.

(3) Uniform image forming layer can be obtained, even with the use of a large area carrier.

(4) Energy efficiency is markedly improved, by provision of a radiation absorbing layer.

(5) Displaying of high speed and high sensitivity with little residual image becomes possible since ultra-thin film enables rapid heat transmission.

(6) A displaying device with excellent driving characteristic and durability can be easily obtained.

The present invention is described in more detail by referring to the Examples.

EXAMPLE 1

(Preparation of recording medium)

A recording medium with a constitution shown in FIG. 1 was prepared as follows.

A radiation absorbing layer 14 was formed by attaching a Gd.Tb.Fe (gadlinium.terbium.iron) layer with a thickness of 1500 Å according to the sputtering method on the surface of a glass plate of 50 mm square.

The diacetylene derivative compound represented by the formula (3) was then dissolved at a concentration of $3 \times 10^{-3}$ mol/liter in chloroform. The solution was spread at pH 6.5 over to surface of the aqueous phase 10 containing $1 \times 10^{-3}$ mol/liter of cadmium chloride. After removal of the solvent chloroform by evaporation, the surface pressure was raised to 20 dyne/cm. While maintaining constantly the surface pressure, the above glass substrate with a clean surface as the carrier was moved vertically in the direction across the water surface gently at a speed of 1.0 cm/min. thereby to transfer the diacetylene monomolecular film onto the carrier to form a diacetylene monomolecular film and diacetylene monomolecular built-up films constituted of 5, 11, 21, 31 and 41 built-up layers, and provide a recording medium.

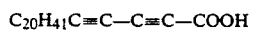 (3)

$C_{20}H_{41}C{\equiv}C{-}C{\equiv}C{-}COOH$     (3)

The recording medium (FIG. 1) was irradiated uniformly and sufficiently with UV-ray (not shown) of 254 nm to form a blue film 15. The recording medium thus prepared is called hereinafter recording medium A.

EXAMPLE 2

(Preparation of recording medium)

A recording medium with a constitution shown in FIG. 1 was prepared as follows.

A radiation absorbing layer 14 was formed by attaching a carbon black layer with a film thickness of 1500 Å according to the vapor deposition method by arc discharging on a glass substrate of 50 mm square.

On the radiation absorbing layer 14 formed on the glass substrate, a monomolecular film and its built-up film was prepared in the same manner as Example 1 and also subjected to UV-ray treatment.

The recording medium thus prepared is hereinafter called recording medium B.

COMPARATIVE EXAMPLE 1

(Preparation of recording medium)

A monomolecular film and its built-up film were prepared except that the radiation absorbing layer was not formed on the glass substrate, and also subjected to UV-ray treatment.

The recording medium thus prepared is hereinafter called recording medium C.

(Recording reproduction experiment 1)

Argon laser beam 16 of output 15 mW, wavelength 488 nm was irradiated according to information input on the recording media A, B and C prepared in Example 1, Example 2 and Comparative example 1, respectively. A, B and C all changed at the exposed portion irradiated by the argon laser beam 16 from blue film to red film, whereby recording based on input information could be realized.

Reproduction of the record was performed by scanning He-Ne laser beam not shown of output 1 mW and wavelength 633 nm, and detecting the transmitted light with a light-receiving device not shown.

Since the portion unexposed with argon laser is blue film, the light of 633 nm is mostly absorbed.

On the other hand, the exposed portion absorbs substantially no light of 633 nm.

Accordingly, reproduction is possible by reading the strength of the transmitted light or reflected light of 633 nm by a light-receiving device.

As a result, in A, B, reproduced signals with high S/N ratio could be obtained. However, in C, no such high S/N ratio could be obtained.

(Recording reproduction experiment 2)

Recording reproduction experiment was attempted according to entirely the same method as Recording reproduction experiment 1 except for changing the light to argon laser of output 10 mW and wavelength 488 nm.

As a result, in A and B, good recording reproduction could yet be obtained, but recording production only with very low contrast could be obtained in C.

EXAMPLE 3

(Preparation of displaying medium)

In the same manner as Example 1, except for using as the diacetylene derivative compound the compound represented by the following formula (4):

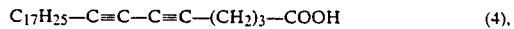

$C_{17}H_{25}{-}C{\equiv}C{-}C{\equiv}C{-}(CH_2)_3{-}COOH$     (4).

a monomolecular film and its built-up film were formed on the substrate provided with a radiation absorbing layer.

UV-ray treatment was applied on the monomolecular film and its built-up film in the same manner as Example 1, followed further by heating to about 50° C., to prepare a displaying medium A having a uniform displaying layer of red film.

EXAMPLE 4

(Preparation of displaying medium)

A displaying medium B was prepared in the same manner as Example 3 except for forming a radiation absorbing layer by attaching a carbon black layer with a film thickness of 1500 Å according to the vapor deposition method by arc discharging on the glass substrate in Example 3.

COMPARATIVE EXAMPLE 2

(Preparation of displaying medium)

A displaying medium C was prepared in the same manner as Example 3 except for not providing the radiation absorbing layer in Example 3.

Preparation example of a displaying device:

A displaying device was experimentally prepared, having an optical signal inputting means and an optical scanning means shown in FIG. 2 by use of an argon laser of output 30 mW and wavelength 480 nm as the light source and a polygon mirror as the scanner.

(Displaying experiment 1)

The displaying media A, B and C prepared in Examples 3, 4 and Comparative example 2 were mounted on the displaying device.

And, scanning irradiation was effected following the input informations, respectively.

A, B and C all changed at the exposed portion 18 irradiated with the argon laser beam 16 from red film to yellow film, thus realizing the display based on the input information.

However, while A and B exhibited particularly excellent contrast, C was usual in contrast. When exposure with the argon laser beam 16 is stopped, the displaying layer returned immediately to the original red film, without discrimination from the unexposed portion, and no residual image was observed.

(Displaying experiment 2)

The displaying experiment was carried out according to entirely the same method as (Displaying experiment 1) except for changing the light to an argon laser of output 15 mW and wavelength 488 nm for the displaying devices A, B and C. As a result, good displaying could be obtained in A and B, but only displaying with low contrast could be obtained in C. For A and B, when repeated displaying was conducted, satisfactory reproducibility could be observed.

We claim:

1. An image-forming medium comprising a substrate, an image-forming layer provided on said substrate and a radiation-absorbing layer provided on said image-forming layer;

said image-forming layer comprising a monomolecular film of a polydiacetylene derivative compound or its built-up film, a monomer of said polydiacetylene derivative compound being represented by the formula

R13 C≡C—C≡C—(R')n—X

2. An image forming medium according to claim 1, wherein the monomolecular film or its built-up film is formed according to the Langmuir-Blodgette method.

3. An image-forming medium according to claim 1, wherein the film thickness of said radiation-absorbing layer is 100 A to 1 μm.

4. An image-forming device comprising an image-forming medium, optical signal inputting and signal scanning means for inputting and scanning optical signals according to information signals at a predetermined site of said medium;

said image-forming medium comprising a substrate, an image-forming layer provided on said substrate and a radiation-absorbing layer provided on said image-forming layer;

said image-forming layer comprising a monomolecular film of a polydiacetylene derivative compound or its built-up film, a monomer of said polydiacetylene derivative compound being represented by the formula

R—C≡C—C≡C—(R') n—X wherein R and R' represent hydrophobic sites, X is a hydrophilic site and n is 0 or 1; whereby upon said image-forming medium being irradiated with radiation from the radiation-absorbing layer generates heat by absorbing said radiation and thereby enhances image-forming in said image-forming layer.

5. An image-forming medium comprising a substrate, a radiation-absorbing layer provided on said substrate and an image-forming layer provided on said radiation-absorbing layer;

said image-forming layer comprising a monomolecular film of a diacetylene derivative compound or its built-up film, said diacetylene derivative compound being represented by the formula

R—C≡C—C≡C—(R')n—X wherein R and R' represent hydrophobic sites, X is a hydrophilic site and n is 0 or 1;

said substrate permitting radiation to pass therethrough; and said radiation-absorbing layer having a radiation-absorbance different from that of said substrate; whereby upon said image-forming medium being irradiated with radiation from the substrate side thereof, said radiation-absorbing layer generates heat by absorbing said radiation to thereby enhance image-forming in said image-forming layer.

6. An image-forming medium according to claim 5, wherein said monomolecular film of said diacetylene derivative compound or its build-up film is formed according to the Langmuir-Blodgette method.

7. An image-forming medium according to claim 5, wherein the film thickness of said radiation-absorbing layer is 100Å to 1μ.

8. An image forming medium according to claim 5, wherein said radiation-absorbing layer is formed of a material selected from the group consisting of Si, SiO, SiO$_2$, ZnS, As$_2$O$_3$, Al$_2$O$_3$, NaF, ZnSe, Gd.Tb.Fe, carbon black and metal phthalocyanines.

9. An image-forming medium comprising a substrate, a radiation-absorbing layer provided on said substrate and an image-forming layer provided on said radiation-absorbing layer;

said image-forming layer comprising a monomolecular film of a polydiacetylene derivative compound or its built-up film, a monomer of said polydiacetylene derivative compound being represented by the formula $$R-C\equiv C-C\equiv C-(R')_n-X$$

wherein R and R' represent hydrophobic sites, X is a hydrophilic site and n is 0 or 1;

said substrate permitting radiation to pass therethrough; and said radiation-absorbing layer having a radiation-absorbance different from that of said substrate; whereby upon said image-forming medium being irradiated with radiation from the substrate side thereof, said radiation-absorbing layer generates heat by absorbing said radiation to thereby enhance image-forming in said image-forming layer.

10. An image forming medium according to claim 9, wherein said radiation-absorbing layer is formed of a material selected from the group consisting of Si, SiO, SiO$_2$, ZnS, As$_2$O$_3$, Al$_2$O$_3$, NaF, ZnSe, Gd.Tb.Fe, carbon black, and metal phthalocyanines.

11. An image-forming device comprising an image-forming medium, optical signal inputting and scanning means for inputting and scanning optical signals according to information signals at a predetermined site of said medium;

said image-forming medium comprising a substrate, a radiation-absorbing layer provided on said substrate, and an image-forming layer provided on said radiation-absorbing layer;

said image-forming layer comprising a monomolecular film of a polydiacetylene derivative compound or its built-up film, a monomer of said polydiacetylene derivative compound being represented by the formula $$R-C\equiv C-C\equiv C-(R')_n-X$$

wherein R and R' represent hydrophobic sites, X is a hydrophilic site and n is 0 or 1;

said substrate permitting radiation to pass therethrough; and said radiation-absorbing layer having a radiation-absorbance different from that said substrate; whereby upon said image-forming medium being irradiated with radiation from the substrate side thereof, said radiation-absorbing layer generates heat by absorbing said radiation to thereby enhance image-forming in said image-forming layer.

* * * * *

UNITED STATES PATENT AND TRADEMARK OFFICE
CERTIFICATE OF CORRECTION

PATENT NO. : 4,957,851
DATED : September 18, 1990
INVENTOR(S) : YOSHINORI TOMIDA, ET AL.

It is certified that error appears in the above-identified patent and that said Letters Patent is hereby corrected as shown below:

COLUMN 2

Line 36, "more excellent" should read --superior to the--.

COLUMN 3

Line 43, "Langmuir-Blodgette" should read
           --Langmuir-Blodgett--.

COLUMN 5

Line 30, "changes" should read --change--.
   Line 39, "treatments" should read --treatment--.

COLUMN 6

Line 61, "image" should read --image.--.

COLUMN 10

Line 2, "R13 C≡C-C≡C-(R')n-X" should read
           --R-C≡C-C≡C-(R')n-X wherein R and R' represent hydrophobic sites, X is a hydrophilic site and n is 0 or 1; whereby said image-forming medium being irradiated with radiation from the radiation-absorbing layer side thereof, said radiation-absorbing layer generates heat by absorbing said radiation and thereby enhances image-forming in said image-forming layer, said radiation-absorbing layer being formed of a material selected from the group consisting of Si, SiO, $SiO_2$ ZnS, $As_2O_3$, $Al_2O_3$, NaF, ZnSe, Gd.Tb.Fe, carbon black and metal phthalocyanines.--.

UNITED STATES PATENT AND TRADEMARK OFFICE
CERTIFICATE OF CORRECTION

PATENT NO.  : 4,957,851
DATED       : September 18, 1990
INVENTOR(S) : YOSHINORI TOMIDA, ET AL.          Page 2 of 2

It is certified that error appears in the above-identified patent and that said Letters Patent is hereby corrected as shown below:

COLUMN 10

Line 6, "Langmuir-Blodgette" should read
        --Langmuir-Blodgett-.
    Line 9, "100 a" should read --100 Å--.
    Line 31, "layer" should read --layer side thereof, said
        radiation-absorbing layer--.
    Line 61, "build-up film" should read --built-up film--.
    Line 62, "Langmuir-Blodgette" should read
        --Langmuir-Blodgett--.

Signed and Sealed this

Tenth Day of November, 1992

Attest:

DOUGLAS B. COMER

Attesting Officer    Acting Commissioner of Patents and Trademarks